(12) United States Patent
Tew (10) Patent No.: US 8,870,282 B2
(45) Date of Patent: Oct. 28, 2014

(54) SYSTEMS AND METHODS FOR PROVIDING AN ERGONOMIC CAR SEAT AND HANDLE

(76) Inventor: Michael Tew, South Jordan, UT (US)

( * ) Notice: Subject to any disclaimer, the term of this patent is extended or adjusted under 35 U.S.C. 154(b) by 39 days.

(21) Appl. No.: 13/252,921

(22) Filed: Oct. 4, 2011

(65) Prior Publication Data
US 2013/0082490 A1 Apr. 4, 2013

(51) Int. Cl.
*A47D 13/02* (2006.01)
*B60N 2/28* (2006.01)

(52) U.S. Cl.
CPC .............. *B60N 2/2845* (2013.01); *A47D 13/02* (2013.01)
USPC ................... 297/183.6; 297/183.3; 297/250.1

(58) Field of Classification Search
USPC .................................. 297/183.6, 183.3, 250.1
See application file for complete search history.

(56) References Cited

U.S. PATENT DOCUMENTS

| | | | | |
|---|---|---|---|---|
| 5,324,094 | A * | 6/1994 | Kain ............................ | 297/183.1 |
| 5,651,581 | A * | 7/1997 | Myers et al. ................ | 297/183.6 |
| 5,658,044 | A * | 8/1997 | Krevh ........................ | 297/183.6 |
| 5,775,770 | A * | 7/1998 | Tunney ...................... | 297/183.1 |
| D427,817 | S * | 7/2000 | Dierickx ..................... | D6/500 |
| D431,116 | S * | 9/2000 | Gibson et al. .............. | D6/333 |
| 6,386,632 | B1 | 5/2002 | Goor et al. | |
| 6,626,489 | B2 * | 9/2003 | Geis et al. .................. | 297/183.1 |
| 6,679,550 | B2 | 1/2004 | Goor et al. | |
| 6,913,313 | B2 | 7/2005 | Sedlack | |
| 6,926,181 | B1 | 8/2005 | Vath | |
| 7,270,372 | B2 * | 9/2007 | Robertson .................. | 297/183.6 |
| 7,472,955 | B2 | 1/2009 | Crane et al. | |
| 2004/0000802 | A1 | 1/2004 | Clement et al. | |
| 2008/0265633 | A1 * | 10/2008 | Chen et al. ................. | 297/183.6 |
| 2009/0058153 | A1 * | 3/2009 | Shafer et al. ............... | 297/183.2 |

* cited by examiner

*Primary Examiner* — David R Dunn
*Assistant Examiner* — Richard Lowry
(74) *Attorney, Agent, or Firm* — David B. Tingey; Bryant J. Keller; Kirton McConkie (57) ABSTRACT

An infant car seat configured to allow a substantial amount of the car seat's weight to rest on a user's arm is described herein. The car seat generally has an ergonomic handle and a seat shell. The handle includes a handgrip that has a first handle arm and a second handle arm that both extend from the handgrip. In some instances, a first end of the first handle arm and a second end of the second handle arm are rotatably connected to the seat shell. Additionally, while the first handle arm typically comprises a first bowed portion that opens in a first direction and a second bowed portion that opens in a second direction, the second handle arm comprises a third bowed portion that opens in the first direction. In some cases, the car seat also comprises a handhold disposed on a lateral side of the seat shell.

18 Claims, 10 Drawing Sheets

SYSTEMS AND METHODS FOR PROVIDING AN ERGONOMIC CAR SEAT AND HANDLE

BACKGROUND OF THE INVENTION

1. Field of the Invention

The present invention relates to infant car seats. More specifically, the present invention relates to systems and methods for providing an ergonomic car seat and handle, and methods for facilitating the carrying of a car seat in a variety of manners.

2. Background and Related Art

Infant car seats are used to conveniently and safely seat and transport babies and small children. Car seats generally have a molded plastic shell that includes a seating surface for supporting an infant and a U-shaped handle that extends transversely across the seat shell. Generally, this handle is rotatably connected to the sides of the seat shell in a manner that allows the handle to be selectively moved between a transport position (in which the handle is selectively locked above the seat) and a storage position (in which the handle is selectively locked behind the seat).

To use some conventional car seats, a user places an infant in the car seat and then fastens the infant in the seat by buckling one or more safety belts. With the infant buckled in place, the user grabs a central portion of the handle and then lifts the car seat.

While conventional car seat handles have been used to carry infants in car seats, shortcomings exist. For example, when a user holds the car seat by grabbing a central portion of the handle, the user's arm is required to be held away from the user's body, which can be awkward and can cause the user's arm, wrist, hand, and/or other body parts can quickly tire. Additionally, the car seat can bang against the user's leg, causing discomfort for both the user and the infant in the seat.

Thus, while techniques currently exist that are used to carry car seats, challenges still exist. Accordingly, it would be an improvement in the art to augment or even replace current techniques with other techniques.

SUMMARY OF THE INVENTION

The present invention relates to infant car seats. More specifically, the present invention relates to systems and methods for providing an ergonomic car seat and handle, and methods for facilitating the carrying of a car seat in a variety of manners.

Implementation of the present invention takes place in association with an ergonomic car seat handle that is configured to allow a substantial amount of the car seat's weight to rest on a portion of the user's arm, such as the user's forearm, and/or to be sustained with a handhold.

The ergonomic handle generally includes a first handle arm and a second handle arm that both extend from a handgrip to a corresponding lateral side of the car seat. In some instances, a first end of the first handle arm and a second end of the second handle arm are rotatably connected to a shell of the car seat.

In some implementations, the handle comprises a plurality of bowed portions that allow the user to insert his or her arm in between an inner surface of the handle and a lateral side of the car seat. In this manner, the handle allows the user to grab a handhold on the side of the car seat and then to carry the car seat so that the car seat's weight rests on the user's hand that is holding the handhold and on a portion of the users' arm that is in contact with the ergonomic handle.

With respect to the bowed portions, in some implementations, the first handle arm comprises a first bowed portion that opens in a first direction and a second bowed portion that opens in a second direction. In such implementations, the second handle arm can also comprise a third bowed portion that opens in the first direction. Furthermore, in some implementations, the first handle arm optionally comprises a fourth bowed portion that is located on a lateral side of the arm and that opens towards a longitudinal axis of the seat. Similarly, in some implementations, the second handle arm optionally comprises a fifth bowed portion that is disposed on a lateral side of the arm and that opens towards a longitudinal axis of the seat.

While the methods and processes of the present invention have proven to be particularly useful in the area of car seats, those skilled in the art can appreciate that the methods and processes can be used in a variety of different applications and in a variety of different areas of manufacture to yield an ergonomic handle for carrying any suitable item, such as a basket, a bucket, or another suitable object in which the ergonomic handle extends transversely across a portion of the object.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to infant car seats. In particular, the present invention relates to systems and methods for providing a car seat with a handle that allows a substantial portion of the car seat's weight to rest on a portion of the user's arm (e.g., the user's forearm) when the user is carrying the car seat. Indeed, in some non-limiting embodiments, the described car seat allows the user to carry the car seat while allowing the user's arm to be in a natural and substantially strain-free position in which the user's arm hangs near the side of the user's body.

Figure 1:
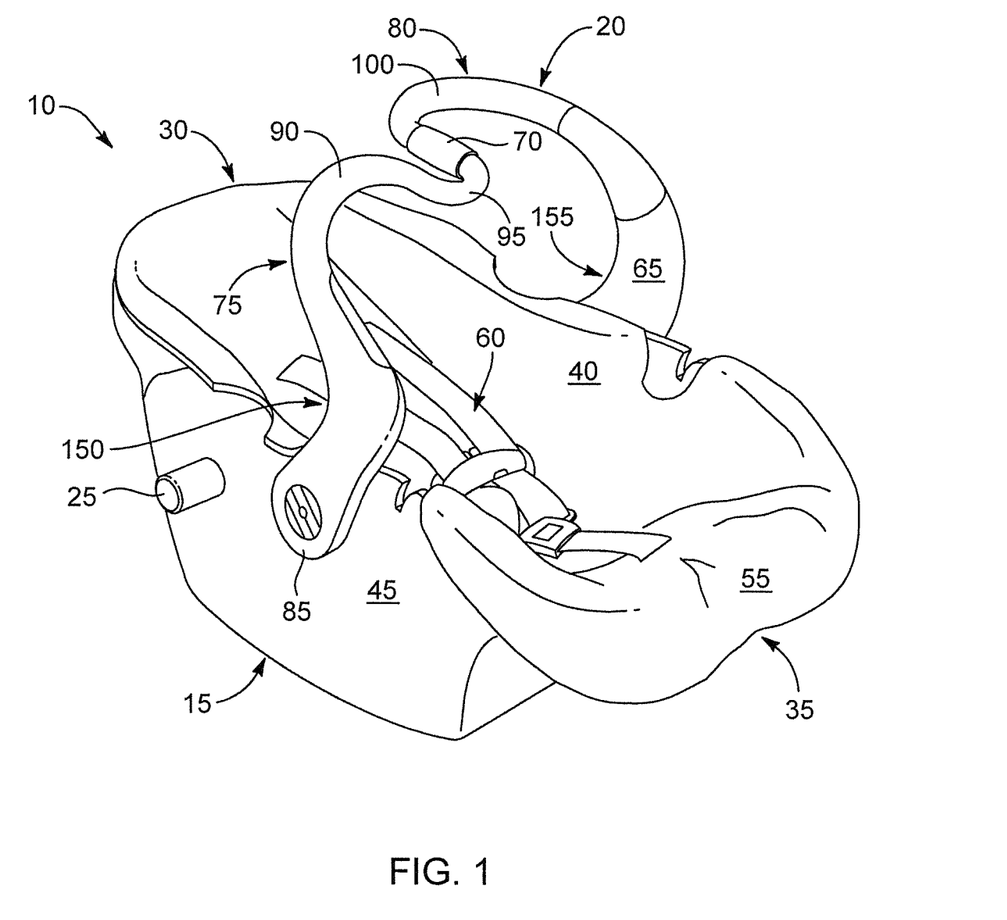
FIG. 1 illustrates a perspective side view of a representative embodiment of a car seat with an ergonomic handle.

While the described car seat can comprise any suitable component, FIG. 1 illustrates a non-limiting embodiment in which the car seat 10 comprises a seat shell 15, an ergonomic handle 20, and a handhold 25. To provide a better understanding of the described car seat, each of the aforementioned components is described below in more detail.

With respect to the seat shell 15, the seat shell can comprise virtually any suitable characteristic that allows it to perform its intended purposes, which include, but are not limited to, safely securing an infant in a car and acting as a carrier to facilitate infant transport. By way of non-limiting illustration, FIG. 1 shows an embodiment in which the seat shell 15 comprises a head end 30, a foot end 35, a pair of side walls 40, a first external lateral side 45, a second external lateral side 50 (not shown), cushioning material 55 to comfortably support the infant, and a safety belt system 60 to secure the infant within the car seat.

With respect to the ergonomic handle 20, the ergonomic handle can comprise any suitable characteristic that allows the user to insert an arm between an inner surface 65 of the handle and a lateral side (e.g., the first 45 or second 50 lateral sides) of the seat shell so that the user's arm is allowed to hang close to the user's body when the user carries the car seat. By way of non-limiting example, FIG. 1 shows an embodiment in which the ergonomic handle 15 comprises a handgrip 70 having a first handle arm 75 and a second handle arm 80 that extend from the handgrip 70 and that allow the ergonomic handle 20 to extend transversely across the seat shell 15. To better describe the ergonomic handle, its various components are described below in more detail.

The handgrip 70 can comprise any suitable characteristic that allows the user to grab it in order to hold the car seat 10. For instance, the handgrip can have any suitable shape, including, without limitation, a cylindrical shape, a tubular shape, a shape that is ergonomically contoured to cradle the user's fingers, and/or any other suitable shape. Additionally, the handgrip can extend in any suitable direction, including, but not limited to, running substantially parallel or perpendicular to a longitudinal axis A of the car seat. In this regard, FIG. 2 shows a non-limiting embodiment in which the length of the handgrip 70 runs substantially parallel to the car seat's longitudinal axis A.

With respect to the first handle arm 75, the first handle arm can comprise any suitable characteristic that allows it to connect the handgrip 70 to the first lateral side 45 of the car seat 10 in a manner that allows the user to carry the car seat by inserting the user's right arm between the inner surface 65 of the ergonomic handle 20 and the car seat's first lateral side 45. By way of non-limiting example, FIG. 2 shows an embodiment in which the first handle arm 75 comprises a first end 85 that pivotally attaches to the car seat's first lateral side 45. In another non-limiting example, FIG. 2 shows the first handle arm 75 comprises a first bowed portion 90. In still another non-limiting embodiment, FIG. 2 shows the first handle arm 75 optionally comprises a second bowed portion 95.

Where the first handle arm 75 comprises the first bowed portion 90, the first bowed portion can serve any suitable purpose. By way of non-limiting example, FIG. 2 shows the first bowed portion 90 provides the ergonomic handle 20 with an arm contact surface 100. As used herein, the term arm contact surface can refer to a portion of handle 20 that is configured to transverse and rest against a width of the user's arm when the user's arm is inserted between the handle's inner surface and a lateral side of the car when the user is grabbing the handhold (discussed below). In another non-limiting example, FIG. 2 shows the first bowed portion 90 defines a first arm indentation 105 that is sized and shaped to receive the user's right arm when the user's right arm is inserted between the inner surface 65 of the ergonomic handle 20 and the first lateral side 45 of the car seat.

Figure 2:
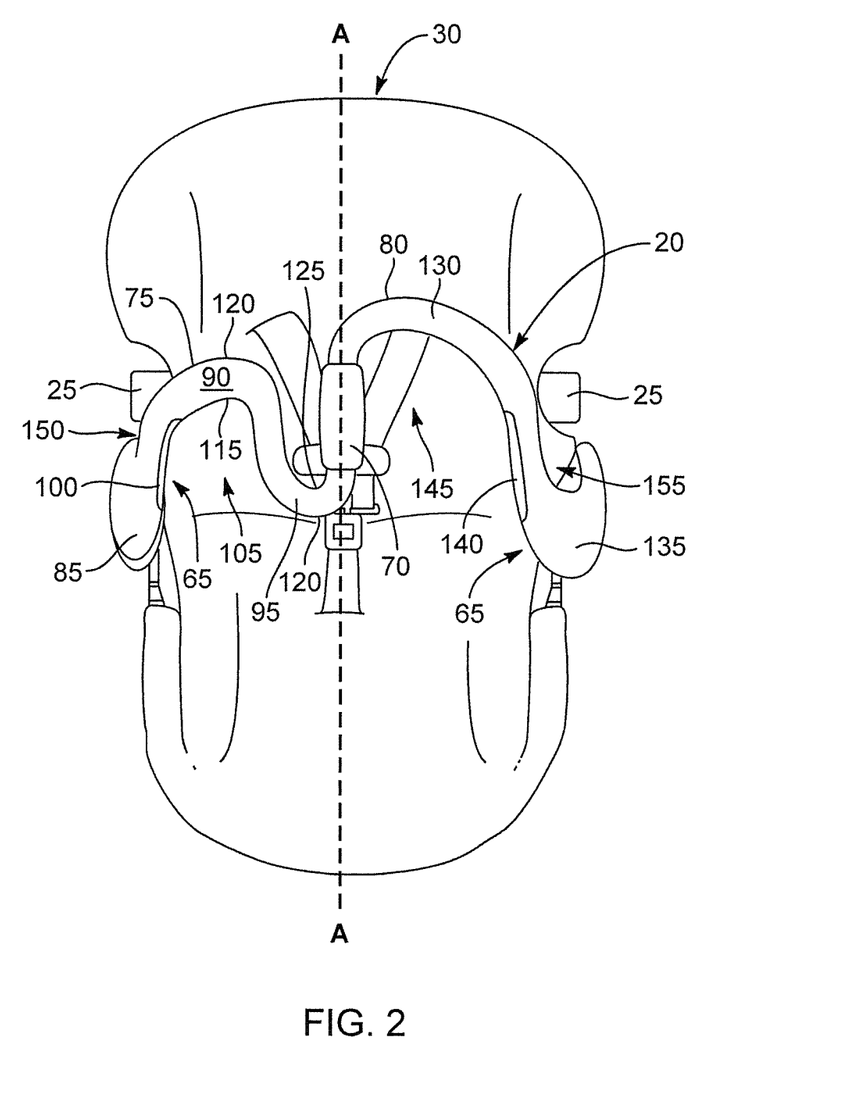
FIG. 2 illustrates a top view of the representative embodiment of FIG. 1.

While the first bowed portion 90 can open in any suitable direction, FIG. 2 illustrates an embodiment in which the first bowed portion 90 opens in a first direction (e.g., towards the car seat's foot end 35 when the handle 20 is in the transport position). Said differently, in some non-limiting embodiments in which the first bowed portion 90 comprises a convex surface 110 and a concave surface 115, the concave surface 115 opens in the first direction (e.g., towards the car seat's foot end 35 when the handle 20 is in the transport position).

While the first bowed portion 90 can extend directly from the handgrip 70, FIG. 2 shows that, in at least one non-limiting embodiment, the second bowed portion 95 extends between the handgrip 70 and the first bowed portion 90. In such embodiments, the second bowed portion can have any suitable characteristic that allows it to provide a transition between the handgrip and the first bowed portion. Indeed, in one non-limiting example, where the first bowed portion 90 opens in a first direction (e.g., towards the car seat's foot end 35 when the handle 20 is in the transport position), the second bowed portion 95 opens in a second direction that is substantially opposite to the first direction (e.g., towards the car seat's head end 30 when the handle 20 is in the transport position). In other words, where the second bowed portion 95 comprises a convex surface 120 and a concave surface 125, the concave surface opens in the second direction (e.g., towards the car seat's head end 30 when the handle 20 is in the transport position).

With respect to the second handle arm 85, the second handle arm can comprise any suitable characteristic allows it to connect the handgrip 70 to the second lateral side 50 of the car seat 10 in a manner that allows the user to carry the car seat by inserting the user's left arm between the inner surface 65 of the ergonomic handle 20 and the car seat's second lateral side 50. In one non-limiting example, FIG. 2 shows the second handle arm 80 comprises a third bowed portion 130 that extends from the handgrip 70 towards a second end 135 of the second handle arm 80, wherein the second end is pivotally attached to the car seat's second lateral side 50.

In another non-limiting example, FIG. 2 shows the third bowed portion 130 provides the second handle arm 80 with an arm contact surface 140 that is configured to transverse and rest against a width of the user's arm when the user's arm is inserted between the handle's inner surface 65 and the second lateral side 50 of the car seat when the user is grabbing the handhold 25 disposed on that side of the car seat.

In still another non-limiting example, FIG. 2 shows the third bowed portion 130 defines a second arm indentation 145 that is sized and shaped to receive the user's left arm when the user's arm is inserted between the inner surface 65 of the ergonomic handle 20 and the second lateral side 50 of the car seat 10.

Where the second handle arm 80 comprises the third bowed portion 130, the third bowed portion can comprise any suitable characteristic that allows it to fulfill its intended purposes. By way of non-limiting example, where the first bowed portion 90 opens in a first direction (e.g., towards the car seat's foot end 35 when the handle 20 is in the transport position), FIG. 2 shows the third bowed portion 130 can open in substantially the same direction.

Where the ergonomic handle 20 comprises a first 90, second 95, and/or third 130 bowed portions, each bowed portion can be any suitable size that allows the bowed portions to function as intended. By way of non-limiting illustration, FIG. 2 shows an embodiment in which the first bowed portion 90 is larger (e.g., is wider) than the second bowed portion 95. FIG. 2 further shows that the third bowed portion 130 is larger than the second bowed portion 95.

The first 90, second 95, and/or third 130 bowed portions can have any suitable shape that allows them to function as intended. Some examples of suitable shapes include, but are not limited to, a shape that is generally U-shaped, rounded, polygonal with any suitable number of edges, irregular, and/or any other suitable shape. By way of non-limiting example, FIG. 2 shows an embodiment in which the first 90, second 95, and third 130 bowed portions are each substantially U-shaped.

In addition to the aforementioned components, the ergonomic handle may comprise any other suitable component or characteristic. Indeed, in one example, FIGS. 1 and 2 show that in some embodiments, the ergonomic handle 20 further defines a first forearm indentation 150 and/or a second forearm indentation 155. In this example, the first and second forearm indentations can serve any suitable purpose, including without limitation, providing a space through which the user can grab the handhold 25. While the first and/or second forearm indentations can open in any suitable direction, FIGS. 1 and 2 show an embodiment in which the first 150 and the second 155 forearm indentations open in the second direction (e.g., towards the car seat's head end 30 when the handle is in the transport position).

In another non-limiting example, the handle 20 optionally comprises one or more bowed portions that are disposed laterally on the first 75 and/or second 80 handle arms. By way of non-limiting illustration, FIGS. 4B, 5B, 6B, and 7B illustrate some representative embodiments in which the first handle arm 75 comprises a fourth bowed portion 66 that is disposed laterally on the handle arm, towards the handle arm's first end 85. Additionally, FIGS. 4B, 5B, 6B, and 7B further show that, in some embodiments, the second handle arm 80 optionally comprises a fifth bowed portion 68 that is disposed laterally on the arm, towards the second end 135 of the second handle arm 80. In such embodiments, the fourth and/or fifth bowed portions can serve any suitable function, including, providing a space that allows the user's arm to comfortably extend between the handle's inner surface (e.g., 65) and one of the car seat's lateral sides (e.g., the first lateral side 45 or the second lateral side 50) to grab the handhold 25.

Where the handle 20 comprises a forth 66 and/or fifth 68 bowed portion, the fourth and/or fifth bowed portions can have any suitable characteristics. In one example, the fourth and/or fifth bowed portions can open in any suitable direction, including, without limitation, towards the car seat's longitudinal axis A. Furthermore, the fourth and/or fifth bowed portions can be any suitable size that allows them to function as intended.

Figure 3A:
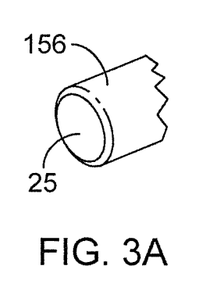
FIGS. 3A-3E illustrate representative embodiments of handholds.
Figure 3B:
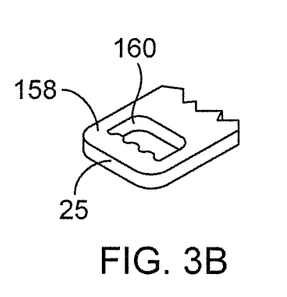
Figure 3C:
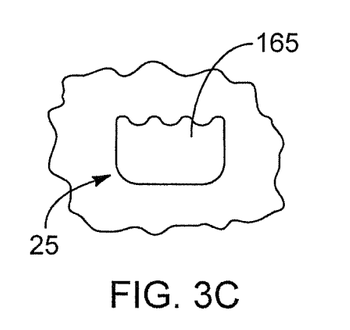
Figure 3D:
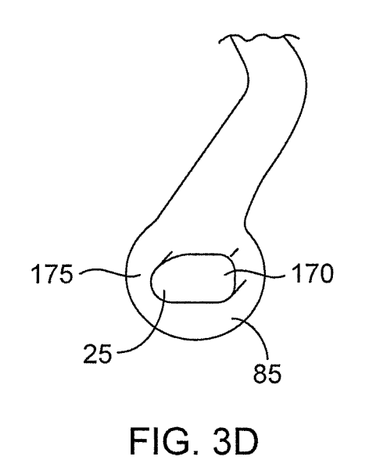
Figure 3E:
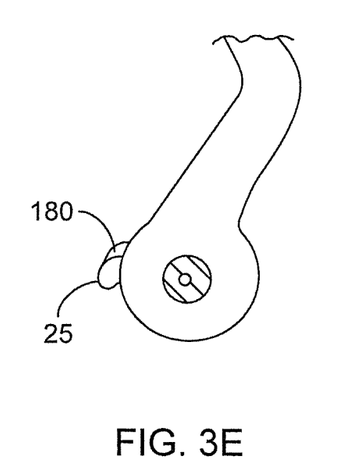
Figure 4A:
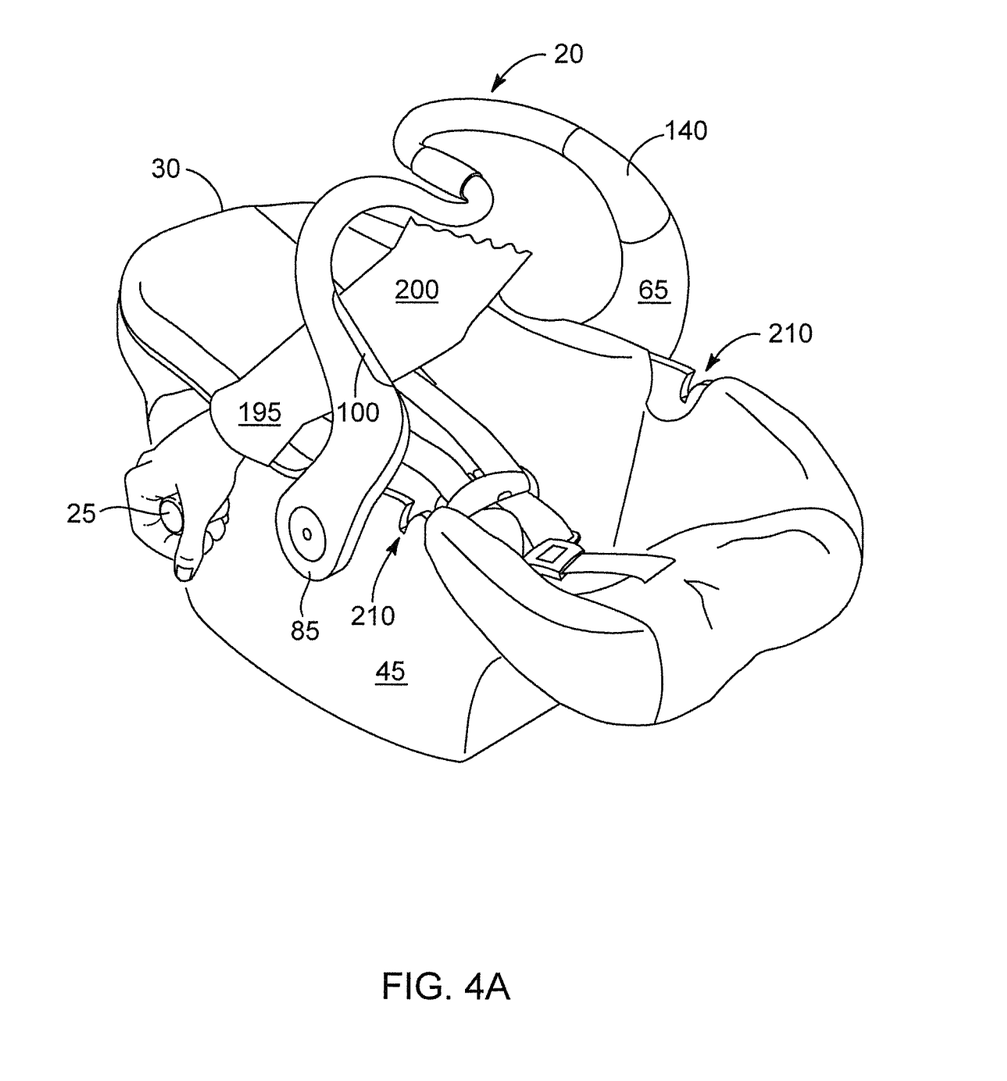
FIG. 4A illustrates a perspective view of a representative embodiment of a car seat with an ergonomic handle, wherein a user's right arm is inserted between an inner surface of the ergonomic handle and a first lateral side of the car seat.
Figure 4B:
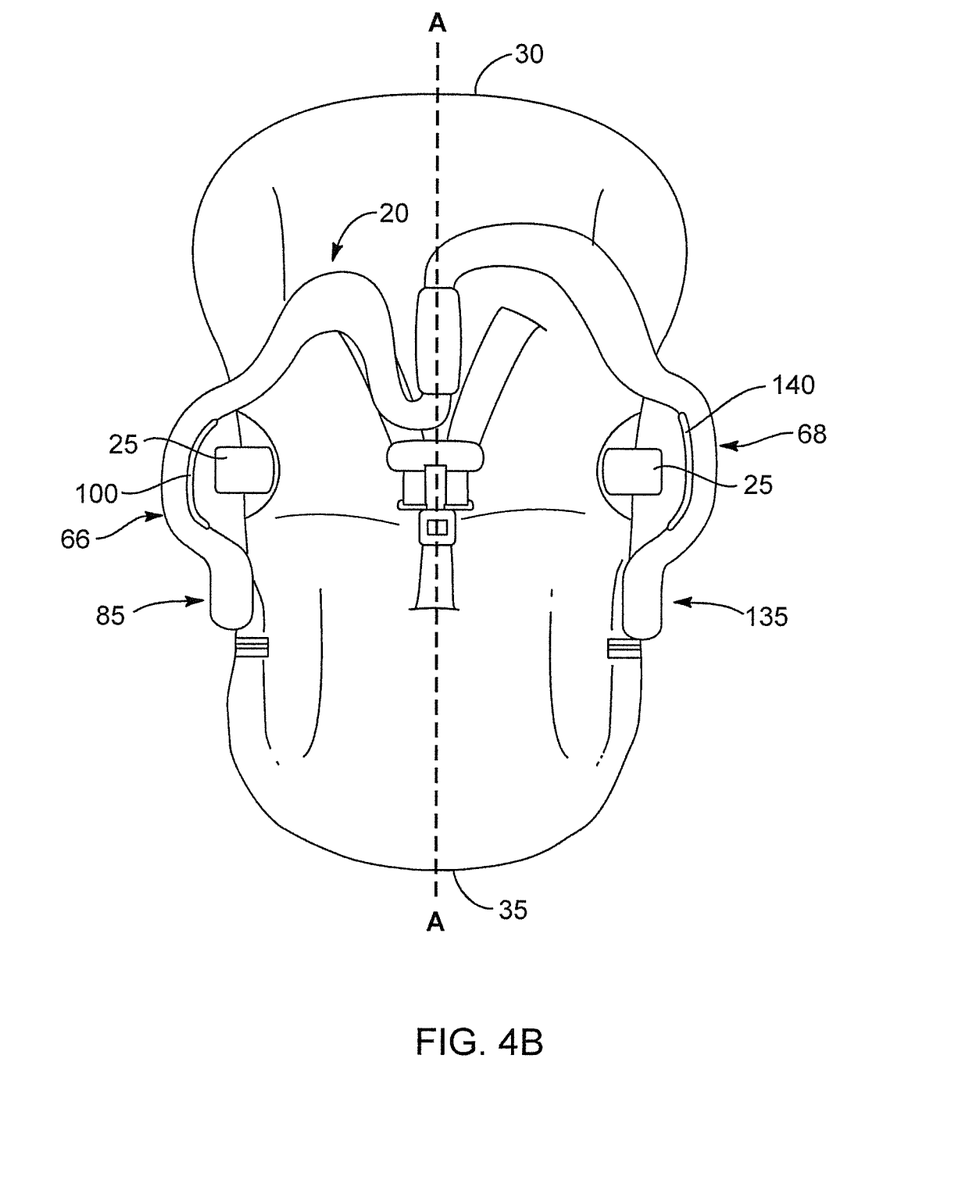
FIG. 4B illustrates a top view of a representative embodiment of the car seat comprising the ergonomic handle, wherein the handle comprises a bowed portion on each lateral side of the handle.
Figure 5A:
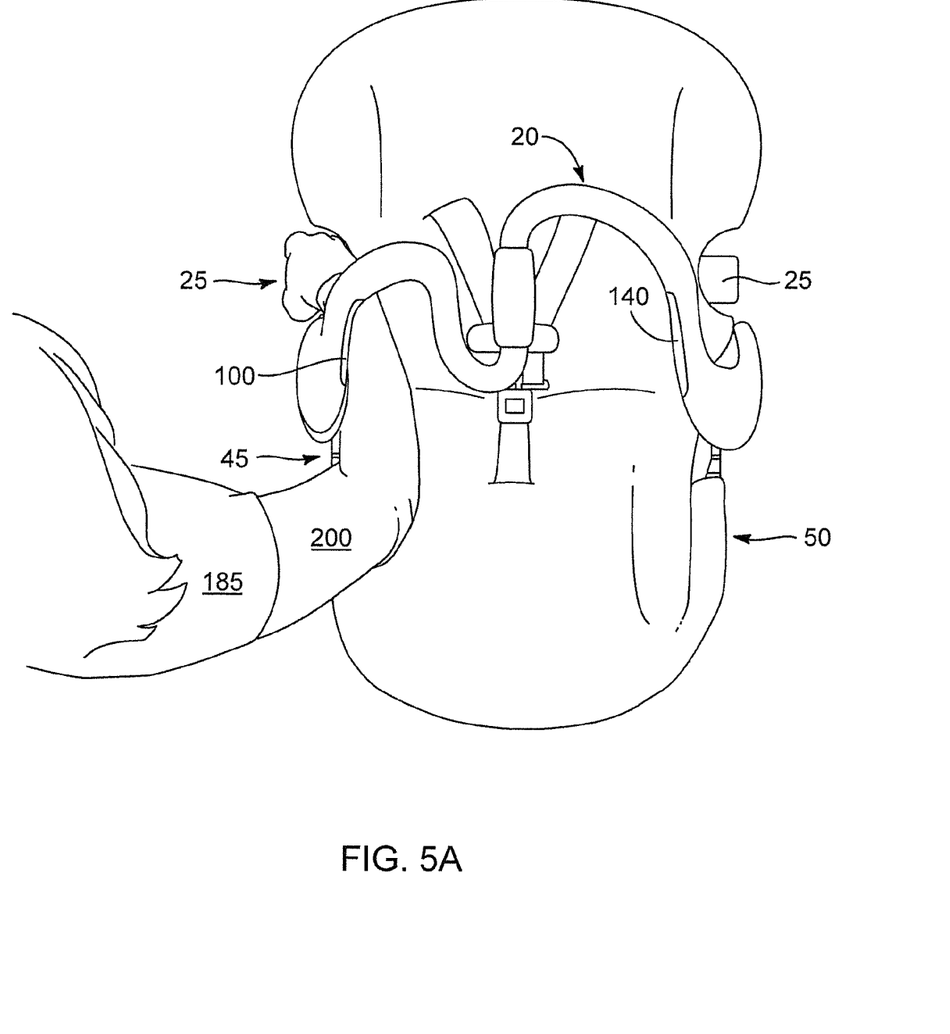
FIG. 5A illustrates a top view of a user holding a representative embodiment of the car seat, wherein the user's right arm is inserted between the inner surface of the ergonomic handle and the first lateral side of the car seat.
Figure 5B:
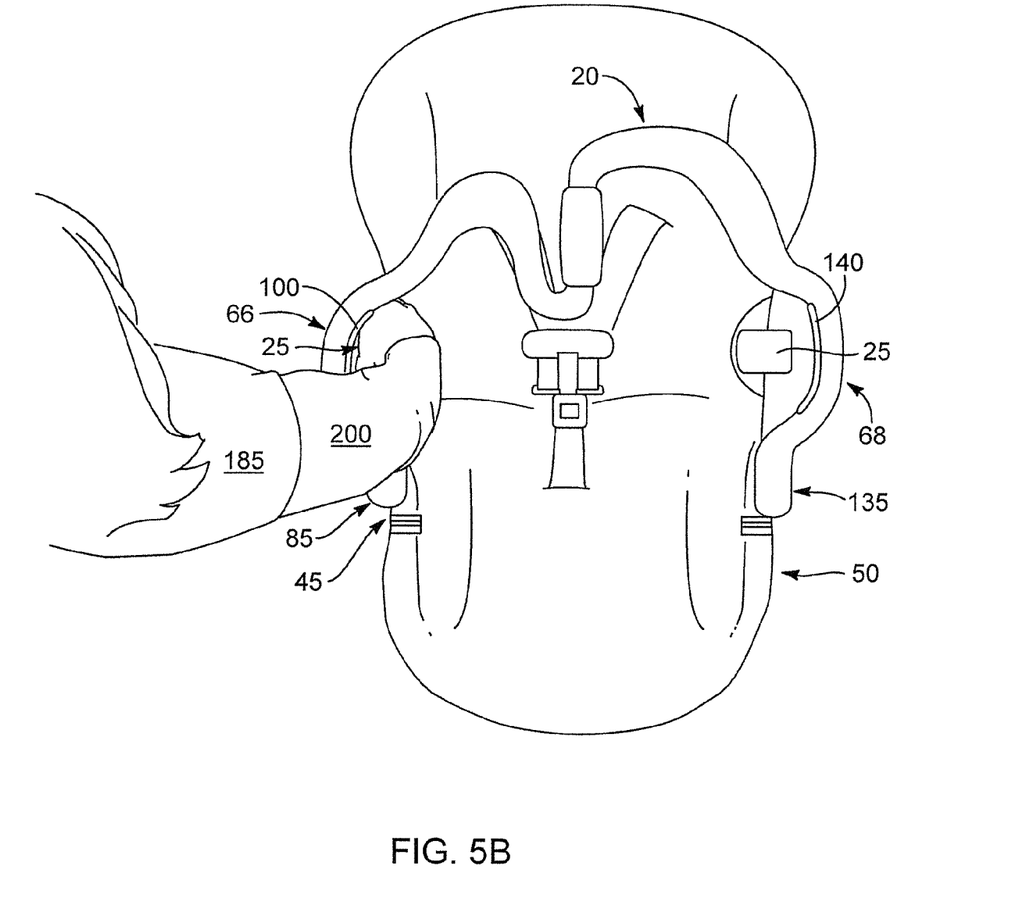
FIG. 5B illustrates a top view of a user holding a representative embodiment of the car seat having the handle shown in FIG. 4B, wherein the user's right arm is inserted between the inner surface of the ergonomic handle and the first lateral side of the car seat.
Figure 6A:
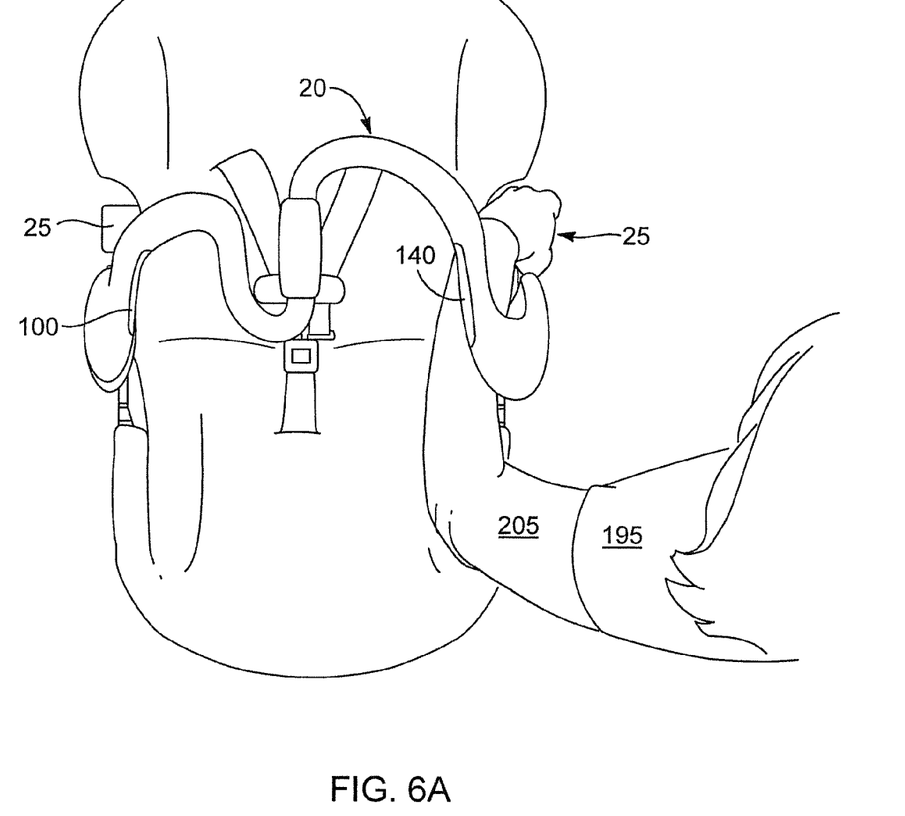
FIG. 6A illustrates a top view of the user holding a representative embodiment of the car seat, wherein the user's left arm is inserted between the inner surface of the ergonomic handle and a second lateral side of the car seat.
Figure 6B:
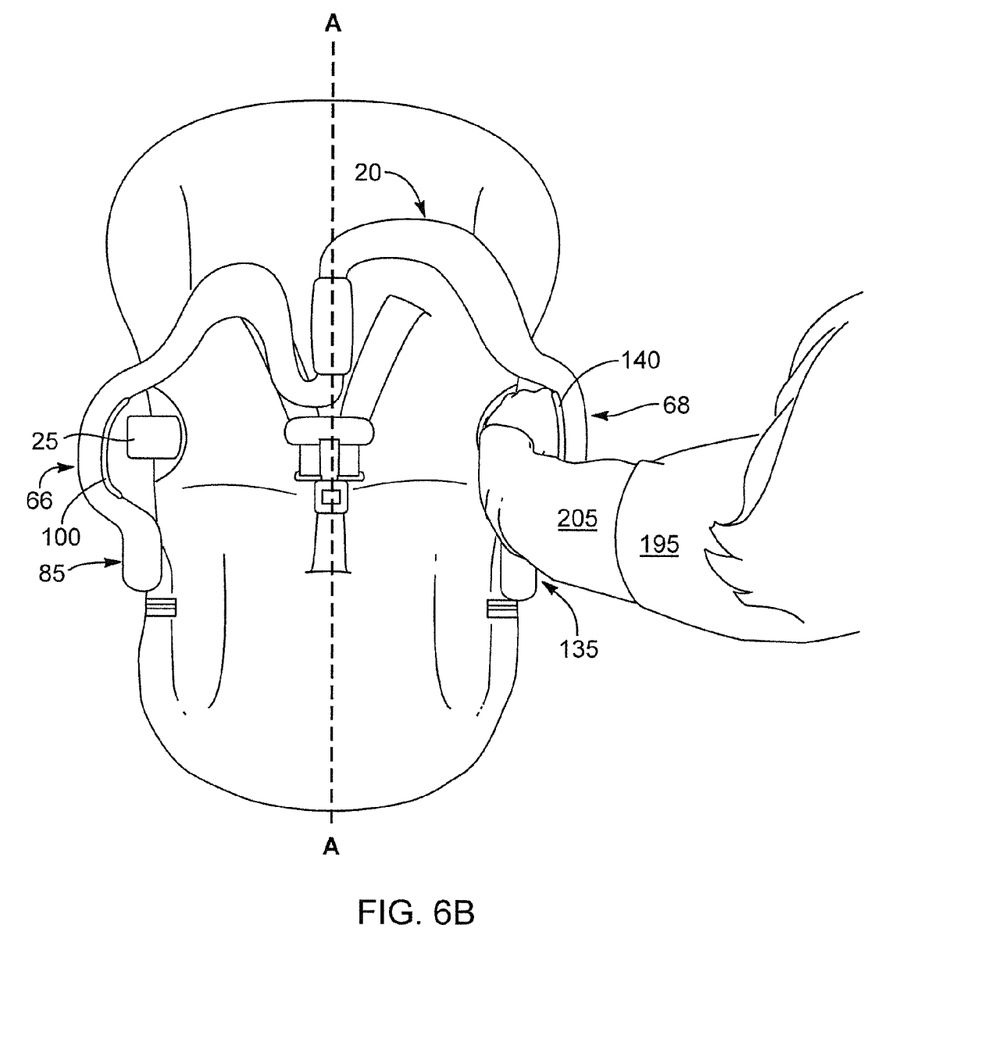
FIG. 6B illustrates a top view of the user holding a representative embodiment of the car seat having the handle shown in FIG. 4B, wherein the user's left arm is inserted between the inner surface of the ergonomic handle and a second lateral side of the car seat.
Figure 7A:
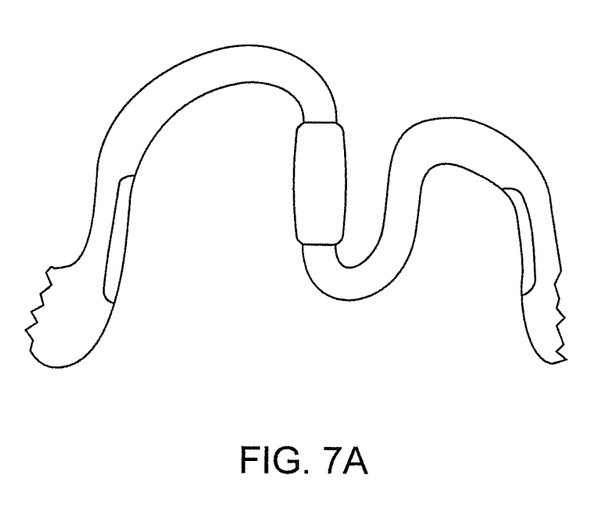
FIG. 7A illustrates a top view of a portion of a representative embodiment of the ergonomic handle shown in FIG. 5A.
Figure 7B:
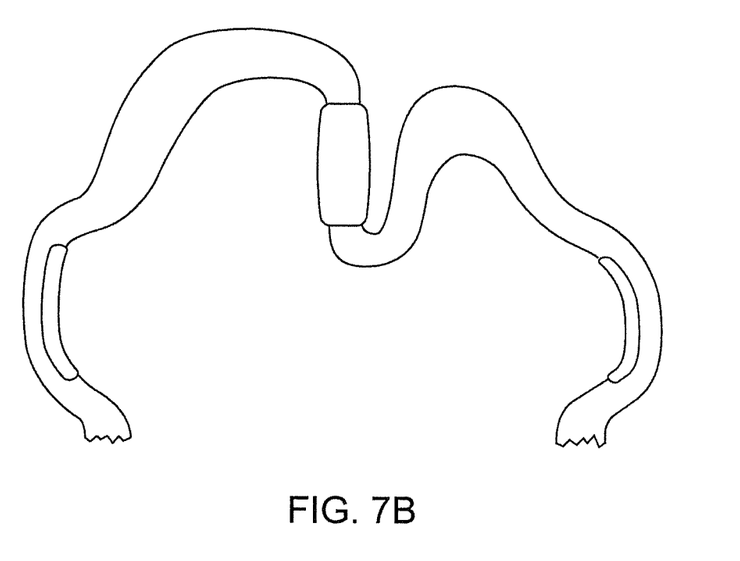
FIG. 7B illustrates a top view of a portion of a representative embodiment of the ergonomic handle shown in FIG. 5B.

Referring now to the handhold 25, the car seat 10 can comprise any suitable handhold that allows the user to carry the car seat by inserting his or her arm between the inner surface 65 of the ergonomic handle 20 and one of the car seat's lateral sides, and by grabbing the handhold disposed on that lateral side. Indeed, in one non-limiting example, the handhold can comprise any suitable shape that allows the user to grab it to carry the car seat. By way of illustration, FIGS. 3A through 3E illustrate different non-limiting embodiments of suitable handholds. Specifically, FIG. 3A shows that in one embodiment, the handhold 25 comprises a knob 156. FIG. 3B shows that in another embodiment, the handhold 25 comprises a projection 158 that defines a hole 160 that is sized and shaped to receive the user's fingers. FIG. 3C shows that in still another embodiment, the handhold 25 comprises an opening 165 that is defined in a lateral side of the car seat and that is sized and shaped to receive the user's fingers when the palm of the user's hand (not shown) faces away from the user. FIG. 3D illustrates another non-limiting embodiment in which the handhold 25 comprises a protrusion 170 that extends from a lateral side 175 of the first end 85 (and/or the second end 135, not shown) of the ergonomic handle 20. Moreover, FIG. 3E illustrates another non-limiting embodiment in which the handhold 25 comprises a grip 180 that is disposed at a perimeter of the first end 85 (and/or the second end 135, not shown) of the ergonomic handle 20.

Where the car seat 10 comprises one or more handholds, the handholds can be disposed in any suitable location. By way of non-limiting example, the handhold can be disposed between the car seat's head end 30 and the handle's first 75 and/or second 135 end, between the car seat's foot end 35 and the handle's first 75 and/or second 135 end, or on the handle's first and/or second ends. In one example, FIG. 4 shows a non-limiting embodiment in which the handhold 25 is disposed between the car seat's head end 30 and the handle's first end 85. In such an embodiment, FIGS. 4 through 6 show the user 195 can carry the car seat 10 by inserting the user's arm (the user's right arm 200 in FIGS. 4 and 5 or the user's left arm 205 in FIG. 6) between the handle's inner surface 65 (FIG. 4) and one of the car seat's lateral sides (the first lateral side 45 in FIGS. 4 and 5 or the second lateral side 50 in FIG. 6) to grab the handhold 25.

It should be noted that FIGS. 1 through 6 illustrate non-limiting embodiments in which the handle's first 90 and the third 130 bowed portions open towards the car seat's foot end 35 so that when the user carries the car seat 10 by the handhold 25, the infant (not shown) faces backward (or in a direction opposite to the direction in which the user faces). In another non-limiting embodiment (not illustrated), however, the ergonomic handle 20 is connected to the car seat shell 15 so that the handle's first end 85 pivotally attaches to the car seat's second lateral side 50 and so that the handle's second end 135 pivotally attaches to the car seat's first lateral side 45. In such an embodiment, when the handle is in the transport position, the first 90 and third 130 bowed portions open towards the seat's head end 30 and the second bowed portion 95 (if included) opens towards the seat's foot end 35. In some such embodiments, the handhold 25 is disposed between the car seat's foot end 35 and the handle's first 85 and/or second 135 ends. Accordingly, in such embodiments, when the user carries the car seat by the handle, the infant faces in the same direction as the user.

In addition to the aforementioned components, the car seat can comprise any other suitable component or characteristic. In one non-limiting example, the arm contact surfaces (100 and 140) comprise a padding material that acts to cushion the handle against the user's arm as the user carries the car seat by the handhold 25.

In another non-limiting example, the seat shell 15 comprises a mechanism for securing the car seat within a car, a stroller, a shopping cart, a base console that is capable of connecting the car seat to another object (such as a seat belt in a car), or any other suitable object. In this example, the securing mechanism can comprise any suitable component that allows the car seat to be selectively secured to and released from an object (e.g., a car, a shopping cart, etc.) Indeed, FIG. 4 shows a non-limiting embodiment in which the seat shell 15 comprises a plurality of grooves 210 that are sized and shaped to receive a seatbelt that is transversely strapped across the car seat 10.

In still another non-limiting example, the first 45 and second 50 lateral sides of the car seat 10 optionally comprise padding (not shown) that is configured to cushion the car seat against the user's side when the user carries the car seat by the handhold.

The ergonomic handle 20 can be made in any suitable manner, including, without limitation, through molding, extrusion, cutting, bonding, bending, or any other process that is capable of forming the handle. Additionally, while in some embodiments the handle 20 and handholds 25 are manufactured and assembled so as to be connected to a seat shell 15, in other embodiments, the ergonomic handle and/or the handholds are sold separate from a car seat shell. Accordingly, the described ergonomic handle and/or handholds can be added to a conventional car seat so that the car seat can be carried in the manners described herein.

The described systems and apparatus offer several beneficial characteristics. In one non-limiting example, the ergonomic handle 20 allows the user to carry the car seat 10 by the handgrip 70, the handhold 25 on the car seat's first lateral side 45, and/or the car seat's second lateral side 50.

In another non-limiting example, when the user carries the car seat by one of the handholds, the handle places a substantial portion of the car seat's weight on the user's arm (e.g., the user's forearm). In this manner, the ergonomic handle can slow the rate at which the user's hand and wrist tire from holding the car seat.

In still another non-limiting example, when the user carries the car seat by the handgrip 70, the user is able to carry the car seat close to the user's body to reduce fatigue.

In still another embodiment, when the user carries the car seat by one of the handholds, the user is able to carry the car seat up high on the user's body so that the car seat does not bang against the user's legs as the user walks with the car seat.

Thus, as discussed herein, the embodiments of the present invention embrace systems and methods for providing an ergonomic car seat and handle, and methods for facilitating the carrying of a car seat in a variety of manners.

The present invention may be embodied in other specific forms without departing from its spirit or essential characteristics. The described examples and embodiments are all to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An ergonomic handle for an infant car seat, the handle comprising:
   a handgrip;
   a first handle arm extending from the handgrip; and
   a second handle arm extending from the handgrip,
   wherein the handgrip is disposed between the first handle arm and the second handle arm,
   wherein a first end of the first handle arm comprises a first connector and a second end of the second handle arm comprises a second connector for rotatably connecting the ergonomic handle to a seat shell,
   wherein the first handle arm comprises a first U-shaped portion that opens in a first direction,
   wherein the first handle arm further comprises a second U-shaped portion that opens in a second direction that is substantially opposite to the first direction such that the first and second U-shaped portions form a reverse curve,
   wherein the second U-shaped portion is disposed between the first U-shaped portion and the handgrip,
   wherein the second handle arm comprises a third U-shaped portion that opens in the first direction, and
   wherein a portion of the first handle arm connecting the first U-shaped portion with the second U-shaped portion runs substantially parallel with a length of a longitudinal axis of the handgrip.

2. The handle of claim 1, further comprising:
   a padded first arm contact surface disposed between the first U-shaped portion and the first end of the first handle arm, and
   a padded second arm contact surface disposed between the third U-shaped portion and the second end of the second handle arm.

3. The handle of claim 1, wherein the second U-shaped portion is smaller than the first U-shaped portion, and wherein the first U-shaped portion is smaller than the third U-shaped portion.

4. The handle of claim 1, further defining a first forearm indentation disposed between the first end of the first handle arm and the handgrip.

5. The handle of claim 4, wherein the second handle arm defines a second forearm indentation, and wherein the first forearm indentation and the second forearm indentation both open in the second direction.

6. The handle of claim 1, wherein the first handle arm comprises a first bowed portion that bows out laterally from flanking portions of the first handle arm on each side of the first bowed portion, wherein the first bowed portion is disposed at a base of the ergonomic handle, adjacent to the first connector, and wherein the bowed portion defines a recess that is sized and shaped to allow at least one of: (i) a user's arm and (ii) a user's hand to extend between an inner surface of the bowed portion, near the base of the handle, and an exterior, lateral surface of the seat shell.

7. An infant car seat, comprising:
   a seat shell comprising a head end and a foot end;
   a handle comprising an inner surface and an outer surface, wherein a first end a second end of the handle are each rotatably attached to the seat shell; and
   a handhold extending from a lateral surface of the infant car seat, wherein a lateral edge of the seat shell comprises a first recess that extends into the seat shell, towards a central axis of the seat shell, and wherein the first recess corresponds in position to the handhold, such that at least one of: (i) a user's arm and (ii) a user's hand is able to extend between the inner surface of the handle and through the first recess to hold the handhold.

8. The car seat of claim 7, wherein the handhold extends from a base portion of the handle.

9. The car seat of claim 7, further comprising:
a padded first arm contact surface disposed on an internal surface of the first bowed portion of the handle.

10. The car seat of claim 7, wherein the handle comprises:
a handgrip;
a first handle arm extending from the handgrip; and
a second handle arm extending from the handgrip,
wherein the first handle arm comprises a first U-shaped portion that opens in a first direction,
wherein the first handle arm further comprises a second U-shaped portion that opens in a second direction that is substantially opposite to the first direction such that the first and second U-shaped portions form a reverse curve, and
wherein the second U-shaped portion is disposed between the first U-shaped portion and the handgrip.

11. The car seat of claim 7, wherein the first end of the handle rotatably connects to the seat shell at a first pivot joint, wherein the handle comprises a first bowed portion that bows out laterally from the handle, wherein the first bowed portion is disposed at a base of the handle, adjacent to the first pivot joint, and wherein the first bowed portion defines a second recess that is sized and shaped to allow the at least one of: (i) the user's arm and (ii) the user's hand to extend through the first recess of the seat shell and through the second recess of the first bowed portion, near the base of the handle, to grab the handhold extending from the lateral surface of the infant car seat.

12. The car seat of claim 7, wherein the handhold is disposed between the head end of the seat shell and a pivot joint that pivotally attaches the handle to the seat shell.

13. An infant car seat, comprising:
a seat shell comprising a head end and a foot end;
a handle; and
a handhold extending from a lateral surface of the infant car seat,
wherein a first end of the handle is rotatably connected to the seat shell at a first pivot joint,
wherein a second end of the handle is rotatably connected to the seat shell at a second pivot joint,
wherein a first lateral side of the handle comprises a first bowed portion that bows out laterally from flanking portions of the handle on each side of the first bowed portion,
wherein the first bowed portion is disposed at a base of the handle, next to the first pivot joint,
wherein the first bowed portion defines a first recess in the handle that is sized and shaped to allow at least one of: (i) a user's arm and (ii) a user's hand to extend, near the base of the handle, between an inner surface of the first bowed portion and an exterior, lateral surface of the seat shell,
wherein a lateral edge of the seat shell comprises a second recess that extends into the seat shell, towards a central axis of the seat shell, and wherein the second recess corresponds in position to the handhold such that the at least one of: (i) the user's arm and (ii) the user's hand is able to extend through the first recess of the bowed portion and through the second recess of the seat shell to hold the handhold.

14. The car seat of claim 13, wherein the handle comprises:
a handgrip;
a first handle arm extending from the handgrip;
a second handle arm extending from the handgrip,
wherein the first handle arm comprises a first U-shaped portion that opens in a first direction,
wherein the first handle arm further comprises a second U-shaped portion that opens in a second direction that is substantially opposite to the first direction such that the first and second U-shaped portions form a reverse curve, and
wherein the second U-shaped portion is disposed between the first U-shaped portion and the handgrip.

15. The car seat of claim 13, wherein the handhold is disposed at the first end of the handle.

16. The car seat of claim 13, wherein the handhold is disposed on a lateral side of the seat shell, between the head end of the seat shell and the first end of the handle.

17. An infant car seat, the car seat comprising:
a seat shell comprising a head end and a foot end; and
a handle comprising:
a handgrip;
a first handle arm extending from the handgrip;
a second handle arm extending from the handgrip,
wherein a first end of the first handle arm and a second end of the second handle rotatably connect, respectively, to the seat shell at a first pivot joint and a second pivot joint,
wherein the first handle arm comprises a bowed portion that bows out laterally from flanking portions of the first handle arm on each side of the bowed portion, wherein the bowed portion is disposed at a base of the first handle arm, next to the first pivot joint, and wherein the bowed portion defines a first recess that is sized and shaped to allow at least one of: (i) a user's arm and (ii) a user's hand to extend through a recess defined by an inner surface of the bowed portion and an exterior, lateral surface of the seat shell, wherein a lateral edge of the seat shell defines a second recess that that extends into the seat shell, towards a central axis of the seat shell, and wherein the second recess corresponds in position to a handhold disposed at a lateral surface of the infant car seat, such that at the least one of: (i) the user's arm and (ii) the user's hand is able to extend through the first recess defined by the bowed portion and through the second recesses to hold the handhold.

18. The car seat of claim 17, wherein
wherein the first handle arm comprises a first U-shaped portion that opens in a first direction,
wherein the first handle arm further comprises a second U-shaped portion that opens in a second direction that is substantially opposite to the first direction such that the first and second U-shaped portions form a reverse curve, and
wherein the second U-shaped portion is disposed between the first U-shaped portion and the handgrip.

* * * * *